Figure 1:
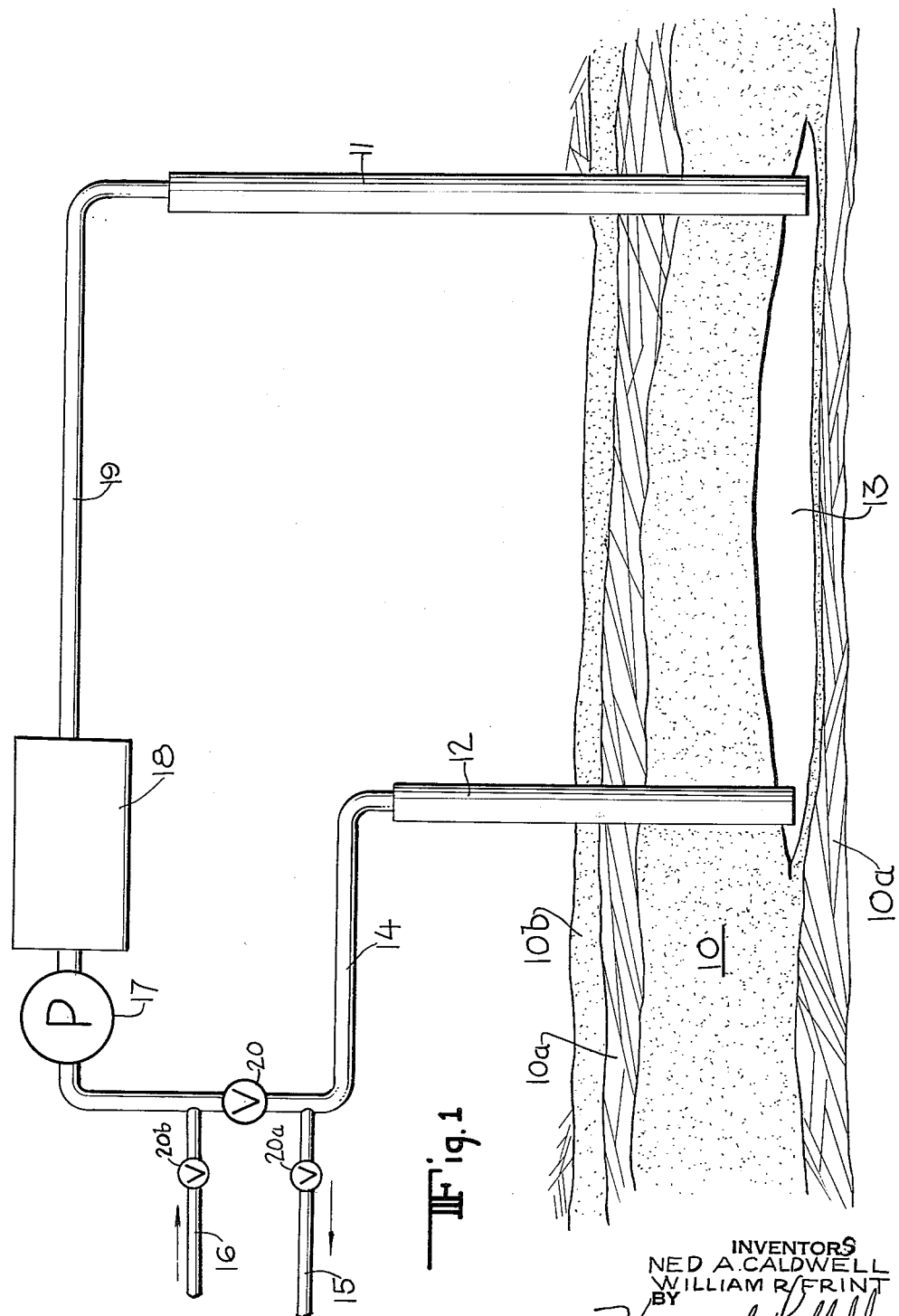

Aug. 21, 1962   N. A. CALDWELL ETAL   3,050,290
METHOD OF RECOVERING SODIUM VALUES BY SOLUTION MINING OF TRONA
Filed Oct. 30, 1959   2 Sheets-Sheet 1

INVENTORS
NED A. CALDWELL
WILLIAM R. FRINT
BY
Hammond & Littell
ATTORNEYS

INVENTORS
NED A. CALDWELL
WILLIAM R. FRINT
BY
ATTORNEYS 3,050,290
METHOD OF RECOVERING SODIUM VALUES
BY SOLUTION MINING OF TRONA
Ned A. Caldwell, Brigham City, Utah, and William R.
Frint, Green River, Wyo., assignors to FMC Corporation, a corporation of Delaware
Filed Oct. 30, 1959, Ser. No. 849,893
12 Claims. (Cl. 262—3)

This invention relates to a method of recovering sodium values by solution mining of trona from an underground trona formation subjected to solution mining.

In the vicinity of Green River, Wyoming, large deposits of trona have been discovered. The trona deposits lie in dense substantially impervious beds or layers 1200 to 1800 feet underground and are separated by layers of shale. The largest and lowest of these trona layers is about 10 to 16 feet thick. By drilling wells to the lower trona-shale interface it has been possible to interconnect wells spaced 1200 feet apart by pumping a hydraulic fracturing fluid into the wells under sufficient pressure to fracture the formation and form a passage between the wells. Normally a surface measured pressure in pounds per square inch of about 1.8 times the depth of the overburden in feet is sufficient to open up a fracture between two or more wells, through which a dissolving fluid such as water or a liquor unsaturated with respect to trona can be circulated between the said wells to dissolve and remove trona from the formation and produce a solution cavity therein.

The normal well spacing preferred for hydraulic fracturing between wells is between 600 and 1200 feet, although the wells may be spaced closer than 600 feet apart and under favorable conditions hydraulic fracturing between wells spaced more than 1200 feet apart can be accomplished.

The initial fracture between wells is essentially a narrow crack or fracture extending from the fractured well or wells to the other wells and tapering to a hair line separation of the trona bed adjacent the edges of the fracture. It initially has a large area of trona exposed to the action of a dissolving liquid on all sides of the narrow fracture.

Trona is much more soluble in hot solvents than in cold solvents and in order to remove more concentrated solutions of trona from the formation it is desirable to circulate a dissolving liquor or other solvent unsaturated with respect to trona through the formation at a high temperature, preferably of the order of 100° to 200° C. or higher. It is also desirable to remove the solution from the formation as hot as possible to facilitate further processing of the more concentrated trona solution to produce soda ash or other products therefrom.

It has been found that as the well exit liquor saturated with trona increases in temperature, greater amounts of trona can be recovered per 100 lbs. of well exit liquor. In an evaporative cooling process in which a recirculating mother liquor is cooled to 45° C. to crystallize sodium sesquicarbonate therefrom and the mother liquor is reheated and recirculated to the trona formation at a temperature of 80° C., 6.40 pounds of soda ash can be produced from every 100 pounds of saturated well exit liquor, by cooling and crystallizing sodium sesquicarbonate from the recirculating mother liquor, whereas at 90° C. the corresponding figure is 8.70 pounds of soda ash and at 100° C., 13.55 pounds of soda ash may be produced per 100 pounds of saturated well exit liquor. If water, instead of a recirculating mother liquor, is used as the solvent and the well exit solution is evaporated completely, the yield per 100 pounds of well exit liquor saturated at 80° C. is 20.5 pounds of soda ash, whereas well exit liquor saturated at 90° C. yields 23.7 pounds of soda ash per 100 pounds of liquor and at 100° C. the yields is 28.7 pounds of soda ash.

The underground formation temperature is, however, about 21° C. and in order to circulate an unsaturated liquor or other solvent through the fracture between wells at approximately 100° C. it is necessary to circulate enough water or unsaturated liquor to heat the solution in the cavity and also the formation surrounding the solution cavity to approximately 100° C. and to maintain it at this temperature. If higher temperatures are desired in the solution cavity, such as, for example, 200° C., it is of course, necessary to circulate a dissolving liquid heated to a temperature which will maintain the desired temperature in the formation, under sufficient pressure to prevent flashing through the formation.

Heat is consumed in four ways. First, the heat of solution for the trona dissolved must be supplied and the total trona dissolved includes the trona required to increase the saturation of the solution in the cavity as well as the trona extracted from the well system. Second, heat is consumed in raising the temperature of the liquor in the cavity. Third, heat is lost to the formation surrounding the cavity by transient conduction. Fourth, as the cavity is enlarged more heat is required to maintain the heat in the solution and in the cavity walls. A substantial and rapid heat input is therefore required to bring the solution and surrounding cavity to the desired dissolving temperature and to maintain it at this temperature and if the time required to heat the underground solution to the desired temperature is unduly prolonged a large amount of dilute brine must either be concentrated above ground to recover the soda values therein or discarded before the well production becomes sufficiently concentrated to be used.

It is an object of this invention to remove a concentrated trona solution from underground trona formations opened to solution mining by pressure fracturing between spaced wells at as high a saturation temperature as economically feasible and as soon as possible after opening a passage between the wells.

Another object of this invention is to provide a method for heating underground trona formations during the dissolving of trona therefrom, by which the heat differential from an inlet well to an outlet well will be kept substantially uniform whereby more uniform dissolution of trona along the entire length of the underground passageway between the wells may be secured.

Another object of this invention is to provide a method of heating underground trona formations during the dissolving of trona therefrom which will be economical and will not require too great heat input into the heat exchangers.

Another object of the invention is to provide a method of heating underground trona formations during the dissolving of trona therefrom by which the time required to heat the underground formation to the desired solution temperature is greatly reduced.

Another object of the invention is to provide a method of quickly bringing an underground trona formation subject to solution mining up to the desired solution mining temperature.

Another object of the invention is to minimize the heat loss in the underground formation while dissolving trona therefrom at desired temperatures of, for example, approximately 50° to 200° C. or higher.

Another object of this invention is to provide a method of heating underground trona formations during the dissolving of trona therefrom by which the trona formation is kept at a more uniform temperature from beginning to end of the dissolving path.

These and other objects of the invention are attained by recirculating a substantial portion of the dissolving liquid removed from the formation back through the formation without extracting any solubles therefrom and adding a relatively small amount of heat thereto during each cycle. In order to recover dissolved trona from the formation a given amount of the hot saturated trona solution removed from the exit well or wells is bled off and conducted to a recovery process during each cycle and replaced by water or dilute mother liquor which is added to the recycle stream to dissolve and remove more trona from the formation.

With no recycle of trona solution to the formation a definite limit is placed on the solution temperatures which can be obtained from an exit well even with the use of high inlet temperatures. The consequent unreasonable demands on the heating equipment would result in low thermal efficiency in the recovery operation and unduly high heating costs and high equipment maintenance costs, while the removal of a dilute brine would increase the cost of recovering the soda values therefrom. Moreover, solution would occur in greater amounts at the hot inlet portion of the underground formation with the danger of subsequent cooling and crystallization underground toward the exit well, as well as the danger of premature caving adjacent the inlet well, due to the larger cavity formed adjacent this well. By maintaining the inlet and exit temperatures of the dissolving liquid within limits of few degrees of each other more uniform dissolving conditions from the inlet to the exit wells are obtained with lesser heat input.

The invention will be described with reference to a single pair of wells, one of which will be designated as the inlet well and the other as the exit well. It will be understood, however, that the invention is applicable to various types of well galleries in which one inlet well may be used with several exit wells or one exit well may be used with several inlet wells or the invention may be applied to the recovery of pillars and other trona values by the solution mining of underground mined out trona mines or other liquifiable mineral deposits.

Figure 2:
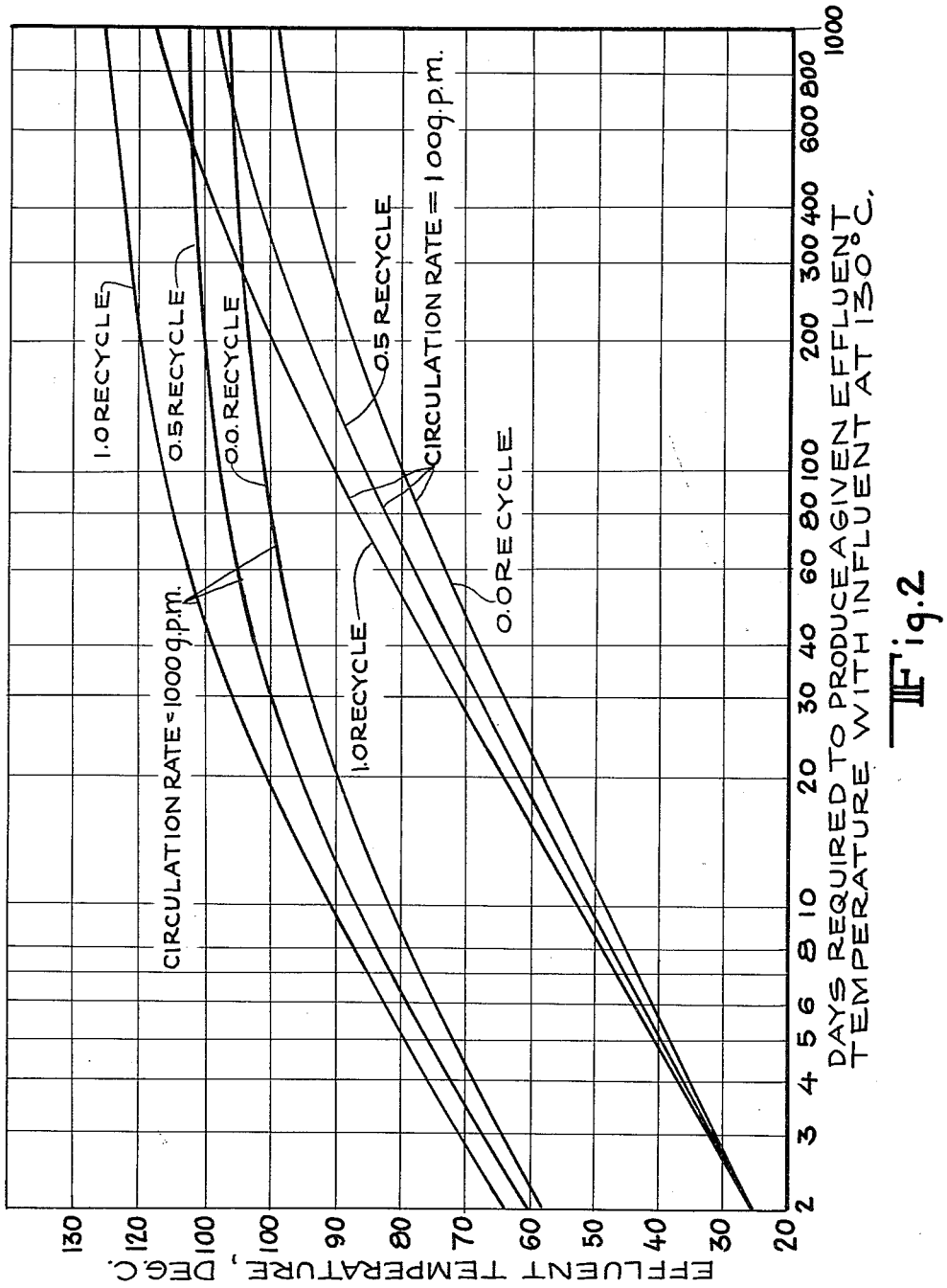

Referring now to the drawings, FIG. 1 shows in a diagrammatic manner an illustrative application of the invention to solution cavity produced by hydraulic fracturing between two wells in a trona bed, and FIG. 2 is a diagram illustrating the time effect of the recycle ratio at various circulation rates in bringing a trona formation up to the desired solution mining temperature.

As illustrated in FIG. 1 the main trona deposit which is approximately 1500 to 1800 feet underground and is a bed of about 12 to 16 feet in thickness is indicated at 10. An impervious layer of shale 10a lies above and below the main trona bed 10 and above the main trona bed additional thinner trona beds 10b separated by layers of shale may occur for a distance of several feet above the main trona bed. Two wells 11 and 12 preferably spaced from 600 to 1200 feet apart have been drilled into the trona formation approximately to the bottom of the bed 10 and after casing and cementing these wells according to oil well drilling practice a connection between the two wells has been established through the trona bed 10 by hydraulically fracturing the formation as described, for example, in the Pullen Patent No. 2,847,202, granted August 12, 1958.

This connection having been established, a passage is opened between the wells 11 and 12 by circulating a dissolving fluid, such as water, therethrough until enough of the trona has been dissolved out to produce a clear passage 13 between the wells, which will not close when the fracturing pressure is removed and the formation allowed to return to its normal pressure. While the passage 13 has been illustrated as a substantially horizontal passage it will be understood that its form and shape have been assumed for purposes of illustration and that the form and shape of the initial passage between any two wells will vary with the pressure on the formation, the faults in the formation, etc., and that its true form can only be a matter of conjecture.

During this preliminary dissolving out period it is preferred to circulate water which is at or below the temperature of the formation, namely 21° C., down one well and out of the other, so that there will be no drop in temperature between wells which might lead to the crystallization of trona dissolved adjacent the inlet well in the passages to the exit well or in the exit well itself. Such crystallization might result in the plugging of the small passages or cracks produced by the hydraulic fracturing adjacent the exit well or the plugging of the exit well itself. However water, either above or below the formation temperature, may be used in the preliminary dissolving-out period if care is taken to prevent recrystallization of trona dissolved from the formation, in the fractured passages or in the exit well.

As trona is much more soluble in hot aqueous solvents than in cold aqueous solvents and as it is more economical to produce solutions of trona as hot as possible to facilitate further processing thereof, after a clear passage has been dissolved out between the wells 10 and 11, it is desirable to heat up the solution in the passage or cavity 13 and to heat the surrounding trona and shale layers to a higher dissolving temperature, preferably of the order of approximately 95° to 200° C. or higher as rapidly as possible.

This is done by connecting the well head of well 12 with a recycle circuit indicated by pipe 14, bleed off 15, fresh water or mother liquor inlet 16, pump 17, heater 18 and return pipe 19 leading back to the well head 11. Suitable valves such as indicated at 20, 20a, and 20b may be used to control the circuits. By maintaining constant high and preferably total recycling, the underground temperatures can be quickly brought up to the best producing temperature. Thereafter by the use of such a recycle circuit various ratios of recycle to fresh water or unsaturated mother liquor inlet can be established by regulation of the valves in bleed off and inlet lines 15 and 16 or by other means to provide lower solvent well inlet temperatures and higher solvent well outlet temperatures than would otherwise be possible and to provide for passage of trona solution through line 15 to a recovery system for producing soda ash therefrom.

For example, in order to produce an exit temperature of 100° C. with water as the solvent without recirculation of any portion of the well exit liquor it would be necessary to introduce water into the formation at an inlet temperature of 201.4° C. with a circulation rate of 153 gallons per minute and with a temperature drop of 101.4° C. between the inlet and outlet wells. To produce higher exit temperature still higher inlet temperatures would be required.

Under the conditions existing in the formation it might become impractical to maintain the water at the desired temperature and in all events the demands on the heating equipment would be unreasonably high, scaling and corrosion of the heating equipment would be high and the temperature differential between the inlet and exit wells would be so great that most of the dissolution and heat loss would be adjacent the inlet well, the thermal efficiency of the process would be low and in the event of stoppage of flow for repairs to pumps or the like the danger of crystallization and salting up adjacent to or in the exit well would be very great.

Table I, as applied to solution mining of the Green River, Wyoming, trona formation, indicates the temperatures of the inlet solvent which are necessary to maintain exit temperatures of 90° C. and 100° C. respectively for the trona solution at various recycle ratios of mother liquor and water and circulation at the rate stated based on the production of 100,000 tons soda ash per year.

TABLE I

*Inlet Temperature Versus Fraction Recycle and Well-Exit Rate (G.P.M.) to Produce 100,000 Tons Soda Ash Per Year*

| Fraction Well-Exit Recycled | Trona Solvent Mother Liquor | | | | Trona Solvent Water | | | |
|---|---|---|---|---|---|---|---|---|
| | Exit Temp., 90° C. | | Exit Temp., 100° C. | | Exit Temp., 90° C. | | Exit Temp., 100° C. | |
| | Inlet Temp., °C. | Circ. Rate, g.p.m. | Inlet Temp., °C. | Circ. Rate, g.p.m. | Inlet Temp., °C. | Circ. Rate, g.p.m. | Inlet Temp., °C. | Circ. Rate, g.p.m. |
| 0.0 | 109.9 | 460 | 140.1 | 290 | 140.0 | 174 | 201.4 | 153 |
| 0.1 | 107.6 | 510 | 135.2 | 320 | 133.6 | 193 | 187.9 | 170 |
| 0.2 | 105.6 | 575 | 130.5 | 360 | 126.6 | 218 | 175.2 | 191 |
| 0.3 | 103.3 | 655 | 126.0 | 415 | 122.2 | 249 | 165.3 | 219 |
| 0.4 | 101.1 | 765 | 121.7 | 485 | 117.0 | 290 | 152.7 | 255 |
| 0.5 | 99.3 | 920 | 117.5 | 580 | 111.6 | 348 | 142.5 | 306 |
| 0.6 | 97.5 | 1,150 | 113.6 | 725 | 106.9 | 435 | 132.8 | 383 |
| 0.7 | 95.4 | 1,530 | 110.0 | 965 | 102.6 | 580 | 123.9 | 510 |
| 0.8 | 93.5 | 2,300 | 106.5 | 1,450 | 98.1 | 870 | 115.5 | 765 |
| 0.9 | 91.8 | 4,600 | 103.1 | 2,900 | 93.9 | 1,740 | 107.5 | 1,530 |

This table shows that with 0 recycle it is necessary, for example, to use a water inlet temperature of 201.4° C. to obtain a trona solution outlet temperature of 100° C., with circulation at the rate of 153 g.p.m., whereas with 0.9 recycle an outlet temperature of 100° C. can be maintained with inlet water temperatures of 107.5° C. and a circulation rate of 1530 g.p.m. With a recycling mother liquor an exit temperature of 100° C. can be secured with an inlet temperature of 103.1° C. with recycle ratio of 0.9 and a circulation rate of 2,900 g.p.m. and with a circulation rate of 580 g.p.m. and an inlet temperature of only 117.5° C., an outlet temperature of 100° C. can be maintained with 0.5 recycle, that is, a bleed off of 50% of the well flow for processing into soda ash.

Table I is based on the assumptions that (1) at the beginning of heating the underground solution in passage 13 is at a temperature of 21.1° C. and is saturated at 21.1° C., (2) the underground solution temperature is the average of the inlet and outlet temperature, (3) for every pound of trona dissolved one pound of shale is heated to the average underground temperature, (4) other heat losses to the formation are considered negligible as compared to the ones taken into account and (5) the well exit solution is saturated at the well exit temperature.

Table II, based on same assumptions as Table I, indicates the number of underground solution volume changes necessary to heat the solution to well exit temperatures of 70°, 80°, 90° and 100°, respectively, with inlet liquor at 130° C. at different recycle ratios, the makeup being water in all cases.

TABLE II

*Heating Rates, 130° C. Inlet Temperature*

Number of Underground Volume Changes to Obtain Well Exit Temperature with Various Fractions Recycle in Well Inlet Solution

FRACTION RECYCLE IN WELL INLET SOLUTION

| Well Exit Temp. | 0.0 | 0.1 | 0.2 | 0.3 | 0.4 | 0.5 | 0.6 | 0.7 | 0.8 | 0.9 | 1.00 |
|---|---|---|---|---|---|---|---|---|---|---|---|
| | Number of Underground Solution Volume Change to Heat to Well Exit Temperatures | | | | | | | | | | |
| 70 | 3.3 | 3.0 | 2.7 | 2.5 | 2.3 | 2.2 | 2.0 | 1.9 | 1.8 | 1.7 | 1.6 |
| 80 | 9.2 | 6.9 | 5.5 | 4.6 | 4.0 | 3.4 | 3.1 | 2.8 | 2.5 | 2.3 | 2.1 |
| 90 | 0.0 | 0.0 | 108 | 20.4 | 11.1 | 7.7 | 5.9 | 4.7 | 4.0 | 3.4 | 3.0 |
| 100 | 0.0 | 0.0 | 0.0 | 0.0 | 0.0 | 0.0 | 34 | 13.0 | 8.1 | 5.8 | 4.6 |

This table shows for example that at 0.1 recycle ratio it would never be possible to bring the well exit temperature to 90° C. with inlet solution at 130° C. due to heat losses within the formation and that at 0.2 recycle ratio 108 underground volume changes would be required to reach an exit temperature of 90° C. This would require a very high circulation rate which would interfere with the deposition of solids underground, and require a large pump capacity and large heating capacity, whereas with 0.9 recycle ratio under similar conditions only 3.4 underground volume changes are required to bring the well exit temperature to 90° C. When circulating at this rate the flow of solution through the underground cavity can be kept at a low enough rate that all insolubles can be separated and deposited underground and clarification and filtration of the solution after it reaches the surface becomes unnecessary.

FIG. 2 based on operating experience with a pair of interconnected wells, and the assumptions stated below, illustrates in graph form the number of days required to heat the formation to a temperature which produces a given effluent temperature with 130° C. influent liquor at circulation rates of 1000 g.p.m. and 100 g.p.m. and recycle ratios of 1.0, 0.5, and 0.0 respectively. Thus as illustrated on the top curve of this graph at a circulation rate of 1000 g.p.m. and with complete recycle of solution heated to 130° C. at the beginning of each passage through the formation it requires 20 days to reach an effluent temperature of 100° C. and 200 days to reach an effluent temperature of 120° C. At 0.5 recycle under similar conditions it requires 30 days to reach an effluent temperature of 100° C. and at 0.0 recycle of 130° C. solvent (water) it would require 80 days to heat the formation and the underground solution to a temperature which would produce an effluent temperature of 100° C. At a circulation rate of 100 g.p.m. and 1.0 recycle it requires 200 days to reach an effluent temperature of 100° C.

The graph of FIG. 2 is based on the assumption that no caving of the formation into the solution cavity occurs. If caving occurs, more heating is required to bring the formation back to the desired temperature and the effect would be to spread the 0.5 and 0.0 recycle curves downwardly more from the 1.0 recycle curve. FIG. 2 is also based on the assumptions that (1) the thermal conductivity and heat capacity of the formation encompassing the cavity is $$\frac{1.2 \text{ PCU-ft.}}{\text{Hr.-ft.}^2\text{-}°\text{ C.}}$$

and 0.23 PCU/lb.-° C., respectively, and its initial temperature is 21.1° C., (2) the heat of solution of trona is 17.8 PCU/lb. in all well brines, (3) the maximum theoretical trona pickup was reached in each pass with no excess carbonate dissolved and fresh water was used as makeup, (4) resistance to heat transfer offered by the surface film on the liquid-solid interface is negligible, (5) the cavity dimensions used for the heat transfer calculations was assumed to be ft. by ft. by ft. (equal to the approximate volume of the then existing underground cavity), (6) during the cavity heating period the effective void volume was assumed to be equivalent to the actual cavity volume, and (7) the heat capacity of well brines and sodium carbonate solutions was assumed to be equivalent for comparable total alkali concentrations. The term "PCU" is the amount of heat required to raise the temperature of one pound of water 1° C.

The time required to reach a high effluent temperature for the trona solution with an inlet temperature of 130° C. along with the aggregate amount of trona extracted is presented in the table below as a function of percentage recycle and circulation rate. This table is based upon the assumption that all effluent liquor is saturated at the effluent temperature.

TABLE III

| Circulation Rate, 130° C., Input Temp., g.p.m. | Fraction Recycle | Time After Circulation Commenced in Days | Effluent liquor Temperature, °C. | Total Na₂CO₃ Extracted to Date, Tons |
|---|---|---|---|---|
| 1,000 | 1.0 | 20 | 100 | 0 |
| 1,000 | 0.5 | 20 | 96 | 15,100 |
| 1,000 | 0.0 | 20 | 89 | 28,600 |
| 1,000 | 0.5 | 29 | 100 | 23,300 |
| 1,000 | 0.0 | 29 | 93 | 43,600 |
| 1,000 | 0.0 | 80 | 100 | 135,300 |
| 100 | 1.0 | 210 | 100 | 0 |
| 100 | 0.5 | 210 | 94 | 15,500 |
| 100 | 0.0 | 210 | 88 | 29,800 |
| 100 | 0.5 | 360 | 100 | 29,000 |
| 100 | 0.0 | 360 | 92 | 54,400 |
| 100 | 0.0 | 1,200 | 100 | 200,000 |

From an inspection of this table, it is obvious that the most economical and rapid method of reaching optimum operating conditions is to use 1.0 recycle in the initial period to reach the desried effluent temperature followed by cooling the saturated effluent to 45° C. to precipitate sodium sesquicarbonate crystals therefrom, diluting the mother liquor to saturation at approximately 30° C., reheating to 130° C., and recirculating through the formation to dissolve more trona. This provides 1.0 recycle during the initial heating up period and about 0.7 recycle for an effluent (temperature of 100° C.) during the extraction period. During the 1.0 recycle period the effluent brine temperature should be raised somewhat above the desired level, say 105° C. so that the inertia effect of the hot formation will prevent the effluent brine temperature from dropping below 100° C. when extraction with diluted mother liquor is commenced.

As a matter of practice we prefer to start with water at 130° C. and recirculate said water solution with complete recycle and reheating to 130° C. until the formation has been heated to produce the desired effluent temperature, after which recovery of the soda values from the solution can begin. However, where an already saturated or partially saturated mother liquor is available the recirculation can be started with a partially or fully saturated motor liquor heated to the desired inlet temperature.

While the above gives a specific method to practice our invention to provide a given effluent temperature in a short time, this is only exemplary and any desired heating up period and effluent temperature may be chosen within the spirit of our invention.

According to the broader practice of our invention a recycle ratio in the extraction period is selected which will maintain the desired trona solution exit temperature from the formation with a low differential between the inlet and outlet temperatures. A rapid heating of the formation to the desired effluent temperature is desired with or without material extraction during the initial heating of the solution cavity and formation. In this manner rapid production may be achieved, excessive temperature differentials may be avoided, while still maintaining a high outlet temperature for the trona solutions, uniform dissolution of trona from end to end of the dissolving passage is obtained, excessive extraction of organics from the shale at high temperature is avoided, thermal gradients in the underground solution are reduced and many other advantages secured.

*Example I*

Two wells 1200 feet apart connected to the bottom trona formation as found at Green River, Wyoming, were interconnected by hydraulic fracturing and the underground formation was heated to over 100° C. by reheating and recycling the solution obtained at the exit well. After the formation reached the desired temperature, the recycling solution was brought into production by bleeding off a portion of the exit well solution to a crystallization process where the hot concentrated solution was run through a vacuum crystallizer causing a drop in temperature of the concentrated solution through flash distillation to about 45° C., crystals of trona $$(Na_2CO_3 \cdot NaHCO_3 \cdot 2H_2O)$$

were separated, recovered and calcined to produce soda ash. The mother liquor was returned to the recycling stream along with sufficient make-up water to replace the amount of water removed in the crystallization process and the combined stream was reheated by means of a heat exchanger and pumped into the inlet well. The following results were obtained during a one week operation of the two wells under the conditions outlined:

| | |
|---|---|
| Average temp. of liquor to wells ° C. | 128.9 |
| Average temp. of liquor from wells ° C. | 107 |
| Average circulation flows rate g.p.m. | 1009.9 |
| Average bleed off g.p.m. | 193 |
| Average make-up flow rate g.p.m. | 193 |
| Recycle ratio (about) | 0.9 |
| Average sp. g. of liquor to wells | 1.205 |
| Average sp. g. of liquor from wells | 1.222 |
| Tons of soda ash equivalent recovered | 401.6 |

The trona exit solution consisted of a mixture of dissolved sodium carbonate and sodium bicarbonate of varying composition depending upon the temperature of the solution, concentration of sodium carbonate and sodium bicarbonate in the recycle stream and on other conditions. The amount of recycle of said removed trona solution may vary from 0.1 to 1.00 part thereof depending upon desired production rates and the desired differential between the input temperature and the exit temperature of the solvent. Complete recycle of the removed trona solution may be used during initial heating up periods or following a major drop in temperature due to excessive caving in the formation even though this results in no recovery of sodium values from the solution. After the formation has been brought to a reasonable operating temperature the amount of recycle may in some operations be materially reduced.

While a preferred practice of the invention has been described and specific temperature ranges have been given by way of example, it will be understood that various modifications and changes can be made from the example, temperature ranges and tables given and that the process described may be used between wells connected by hydraulic fracturing or connected in any other way, or to single wells having a large solution cavity therearound or to cavities produced by dry mining operations within the scope of the following claims.

We claim:

1. The method of recovering sodium values from an underground trona formation which comprises circulating a solvent for trona through the formation, removing the trona solution from the formation, reheating and recycling all of said solution through the trona formation until the underground trona formation is heated, reheating and recycling a part of said removed trona solution through the formation, bleeding off the remainder of said removed trona solution to recover sodium values therefrom and adding make-up solvent to replace the bled off solution.

2. The method of recovering sodium values from an underground trona formation which comprises circulating a solvent for trona through the formation, removing the trona solution from the formation, reheating and recycling all of said solution through the formation until the exit temperature of said solution exceeds 100° C. and then reheating and recycling from 0.1 to .95 part of said removed trona solution through the formation, bleeding off the remainder of said removed trona solution to recover sodium values therefrom and adding heated make-up solvent to replace the bled off solution.

3. The method of removing trona from an underground trona formation which comprises drilling wells into the trona formation, hydraulically fracturing the formation to connect said wells, circulating a hot solution at a temperature between 50° and 200° C. of sodium carbonate and sodium bicarbonate through a portion of the trona formation between said wells, which solution is unsaturated with reference to trona at the temperature of circulation, to dissolve trona from the said underground formation, removing the trona solution from the formation, reheating and recycling all of said solution through the formation until the underground trona formation is heated and reheating and recycling a part of said solution through said formation to maintain heat in said formation.

4. The method of removing trona from an underground trona formation which comprises drilling wells into the trona formation, hydraulically fracturing the formation to connect said wells, circulating a solvent for trona through the formation, removing the trona solution from the formation, reheating and recycling all of said solution through the formation until the exit temperature of said solution exceeds 100° C. and then reheating and recycling from 0.1 to .95 part of said removed trona solution through the formation, bleeding off the remainder of said removed trona solution to recover sodium values therefrom and adding heated make-up solvent to replace the bled off solution.

5. The method of removing trona from an underground trona formation which comprises drilling wells into the trona formation, hydraulically fracturing the formation to connect said wells through the trona formation, circulating a hot solution of sodium carbonate and sodium bicarbonate through the trona formation between said wells which is unsaturated with reference to trona at the temperature of circulation to dissolve trona from the said underground formation, removing the trona solution from the formation, reheating and recycling all of said solution through the formation until the underground trona formation is heated and reheating and recycling from 0.1 to 0.95 part of said solution through said formation to maintain heat in said formation.

6. The method of removing trona from an underground trona formation which comprises drilling wells into the trona formation, hydraulically fracturing the formation to connect said wells, circulating a hot solution of sodium carbonate and sodium bicarbonate through the trona formation between said wells which is unsaturated with reference to trona at the temperature of circulation to dissolve trona from the said underground formation and reheating and recycling all of said solution through the formation until the exit temperature of said solution exceeds 100° C. and then reheating and recycling from 0.1 to 0.95 part of said solution through said formation to maintain heat in said formation.

7. The method of removing trona from an underground trona formation through spaced wells connected by fracturing the formation which comprises circulating a solution of sodium carbonate and sodium bicarbonate heated to a temperature between about 90° and about 130° C. and which is unsaturated with respect to trona through the trona formation to dissolve trona therefrom, removing the solution from the trona formation, reheating and recycling all of said solution through the trona formation until the trona formation is heated, removing a portion of the solution for further processing and recirculating between 50% and 95% of said removed trona solution back through the formation with the addition of make-up solution to replace that portion removed.

8. In a process for the fluid mining of trona from underground deposits by the method of circulating a heated solvent through an input well, the formation and an output well, the improvement which comprises recycling a part of said saturated solvent from the output well to the input well in order to conserve and maintain heat in the formation and maintain an exit temperature of the saturated solvent of greater than 80° C.

9. In a process for the fluid mining of trona from underground deposits by the method of circulating a heated solvent through an input well, the formation and an output well, the improvement which comprises recycling .50 to .95 part of said solvent from the output well to the input well in order to conserve and maintain heat in the formation and maintain an exit temperature of the saturated solvent of greater than 80° C.

10. A process for the solution mining of trona occurring in underground formations which comprises circulating an aqueous solvent at an input temperature of from about 110° C. to about 130° C. through the trona formation, removing a saturated solution from the formation at a temperature above about 90° C., reheating and recycling from 0.5 to 0.95 part of said saturated solvent through the formation, bleeding off the remainder of said saturated solvent and recovering sodium values therefrom by crystallization, adding make-up water to the mother liquor resulting from the crystallization step and adding the resultant dilute aqueous solvent to the recirculating saturated solvent prior to the reheating step.

11. A process for the solution mining of trona occurring in underground formations which comprises circulating an aqueous solvent at an input temperature of from about 110° C. to about 130° C. through the trona formation, removing a saturated solution from the formation at a temperature above 90° C., reheating and recycling all of said solution through the formation until the exit temperatures of said solution exceeds 100° C. and then reheating and recycling from 0.5 to 0.95 part of said saturated solvent through the formation, bleeding off the remainder of said saturated solvent and recovering sodium values therefrom by crystallization, adding make-up water to the mother liquor resulting from the crystallization step and adding the resultant dilute aqueous solvent to the recirculating saturated solvent prior to the reheating step.

12. The method of maintaining heat in an underground trona formation during solution mining thereof which comprises circulating a dissolving liquid through the trona formation to dissolve trona therefrom, removing the dissolving liquid from the formation, reheating and recycling all of said liquid through the trona formation until the inlet temperature is not greater than about 40° C. above the outlet temperature from said formation, bleeding off a portion of said dissolving liquid to recover sodium values therefrom, reheating and recycling in excess of 50% of the dissolving liquid to the formation and adding make-up solution to said dissolving solution in excess of the amount bled off.

References Cited in the file of this patent

UNITED STATES PATENTS

| | | |
|---|---|---|
| 2,161,800 | Cross | June 13, 1939 |
| 2,388,009 | Pike | Oct. 30, 1945 |
| 2,665,124 | Cross | Jan. 5, 1954 |
| 2,847,202 | Pullen | Aug. 12, 1958 |